US012773797B2

(12) United States Patent
Suwa

(10) Patent No.: US 12,773,797 B2
(45) Date of Patent: Oct. 27, 2026

(54) HOLDING MECHANISM, ROBOT DEVICE

(71) Applicant: CANON KABUSHIKI KAISHA, Tokyo (JP)

(72) Inventor: Yoshiki Suwa, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 644 days.

(21) Appl. No.: 18/059,543

(22) Filed: Nov. 29, 2022

(65) Prior Publication Data

US 2023/0182327 A1 Jun. 15, 2023

(30) Foreign Application Priority Data

Dec. 10, 2021 (JP) ................................ 2021-200748

(51) Int. Cl.

| | |
|---|---|
| ***B25J 19/00*** | (2006.01) |
| ***B25J 13/08*** | (2006.01) |
| ***F16L 3/123*** | (2006.01) |
| ***F16L 3/137*** | (2006.01) |

(52) U.S. Cl.

CPC ......... *B25J 19/0025* (2013.01); *B25J 13/085* (2013.01); *F16L 3/123* (2013.01); *F16L 3/137* (2013.01)

(58) Field of Classification Search

CPC ...... B25J 19/0025; B25J 13/085; F16L 3/123; F16L 3/137

See application file for complete search history.

(56) References Cited

U.S. PATENT DOCUMENTS

| | | | | |
|---|---|---|---|---|
| 4,507,042 | A * | 3/1985 | Suzuki | B23K 9/287 901/50 |
| 5,221,065 | A | 6/1993 | Siems | |
| 9,764,483 | B2 * | 9/2017 | Okahisa | B25J 18/00 |
| 11,529,732 | B2 * | 12/2022 | Inoue | B25J 9/123 |
| 11,806,866 | B2 * | 11/2023 | Mizoguchi | B25J 19/0025 |
| 12,128,552 | B2 * | 10/2024 | Grella | B25J 19/0025 |

(Continued)

FOREIGN PATENT DOCUMENTS

| | | | | |
|---|---|---|---|---|
| EP | 2684654 | A2 * | 1/2014 | H02G 11/00 |
| JP | 2003-333735 | A | 11/2003 | |

(Continued)

OTHER PUBLICATIONS techbriefs.com online article dated May 1, 2018 titled “The Less is More Approach to Robotic Cable Management” https://www.techbriefs.com/component/content/article/28862-the-less-is-more-approach-to-robotic-cable-management (Year: 2018).*

(Continued)

*Primary Examiner* — Terrell L McKinnon
*Assistant Examiner* — Ding Y Tan
(74) *Attorney, Agent, or Firm* — VENABLE LLP

(57) ABSTRACT

A holding mechanism configured to hold a wire rod includes a band configured to fasten the wire rod, and a holding member. The holding member includes a contact portion configured to come into contact with the wire rod, a first regulation portion configured to regulate a position of a first portion of the band, and a second regulation portion configured to regulate a position of a second portion of the band. A distance between the first regulation portion and the second regulation portion is smaller than a diameter of the wire rod.

15 Claims, 10 Drawing Sheets

(56) References Cited

U.S. PATENT DOCUMENTS

| | | | | |
|---|---|---|---|---|
| 2008/0035799 | A1* | 2/2008 | Yamamoto | F16L 3/015 248/49 |
| 2009/0255711 | A1* | 10/2009 | Choi | B25J 19/0025 174/135 |
| 2011/0203402 | A1* | 8/2011 | Barkman | B25J 9/0009 74/490.02 |
| 2014/0013893 | A1* | 1/2014 | Asano | H02G 15/00 901/27 |
| 2014/0083229 | A1* | 3/2014 | Kume | F16L 3/01 901/27 |
| 2016/0067870 | A1* | 3/2016 | Kono | F16L 3/1016 901/23 |
| 2019/0061145 | A1* | 2/2019 | Ohtsubo | B25J 9/0024 |
| 2019/0291286 | A1* | 9/2019 | Adachi | H02G 3/32 |
| 2019/0329428 | A1* | 10/2019 | Sakurai | B25J 18/00 |
| 2020/0055201 | A1* | 2/2020 | Joesten | F16L 3/015 |
| 2020/0298427 | A1* | 9/2020 | Inoue | B25J 9/046 |
| 2021/0016435 | A1* | 1/2021 | Ehleiter | B25J 9/142 |
| 2021/0299871 | A1* | 9/2021 | Hiraide | B25J 9/163 |
| 2023/0088797 | A1* | 3/2023 | Fujioka | B25J 17/0241 74/490.05 |

FOREIGN PATENT DOCUMENTS

| | | | | | |
|---|---|---|---|---|---|
| JP | 2005-343538 | A | | 12/2005 | |
| JP | 2012-61565 | A | | 3/2012 | |
| JP | 2014-111294 | A | | 6/2014 | |
| JP | 2020-116686 | A | | 8/2020 | |
| JP | 2021-70081 | A | | 5/2021 | |
| JP | 2021070081 | A | * | 5/2021 | |
| WO | WO-9819090 | A1 | * | 5/1998 | F16L 3/01 |

OTHER PUBLICATIONS

Japanese Office Action issued Nov. 11, 2025, during prosecution of Japanese application No. 2021-200748 (English language machine translation included).

* cited by examiner

HOLDING MECHANISM, ROBOT DEVICE

BACKGROUND OF THE INVENTION

Field of the Invention

The present invention relates to a technique for holding wire rods.

Description of the Related Art

In recent years, in a robot device, for example, a multi-axis articulated robot in which joints are rotatable, a device is known in which torque sensors for measuring torque applied to links by drive sources are arranged in the joints, and torque generated in the joints is measured to control the drive sources. The torque sensors are arranged in the joints to facilitate controlling forces generated in the joints and controlling a load and a force applied to a work target object by an end effector arranged at the distal end of a robot arm.

Such a robot device requires transmission members for transmitting control signals and drive energy, for example, in order to drive and control actuators of respective joints. For example, lines through which electric signals or optical signals are transmitted as control signals, and lines or pipelines through which drive energy such as electric power, hydraulic pressure, or air pressure is supplied are included. Specifically, in a robot using rotary drive sources such as motors as driving sources (actuators) that drive joints or an end effector, wire rods such as electric wires (cable) are used as transmission members that transmit control signals or drive power to the motors or drive circuits thereof. In a case where actuators using hydraulic pressure, air pressure, or the like are used to drive joints or an end effector, wire rods such as pressure tubes formed from a flexible material such as rubber are used as transmission members in order to transmit drive signals (energy).

These wire rods straddle axes of a multi-axis articulated robot, and thus can be generation sources of friction torque at joint portions. Specifically, a reaction force due to vibration of the wire rods and the moment or tension of the weight of the wire rods that varies depending on the posture are generated. These are dominant generation factors of an internal force detected by the torque sensors included in the joints.

Originally, what is desired to be detected by the torque sensors for drive control is torque externally applied to the end effector or the joints, that is, an external force. However, what is detected by the torque sensors is a value obtained by combining an external force and an internal force, that is, a detection value including the internal force such as friction torque of the joint portions.

In order to improve the accuracy of drive control, the measurement accuracy of an external force needs to be improved, but since a value obtained by combining an external force and an internal force is detected, increasing the resolution of the torque sensors alone does not solve the issue. For example, in a case where an attempt is made to cause a robot device to perform assembly work of minute loads having a load of about several grams, the ratio of an internal force to an external force in detected torque is large, and thus highly accurate drive control is difficult, and precise work cannot be performed.

Therefore, reducing generation of an internal force caused by installed wire rods as much as possible even if a robot device is driven, and reducing fluctuation of an internal force even if the posture (joint rotation amount) is changed are desired.

Japanese Patent Application Laid-Open No. 2014-111294 proposes a wiring guide method for regulating movement of wire rods to reduce a wire rod reaction force (bending force).

SUMMARY OF THE INVENTION

According to a first aspect of the present invention, a holding mechanism configured to hold a wire rod includes a band configured to fasten the wire rod, and a holding member. The holding member includes a contact portion configured to come into contact with the wire rod, a first regulation portion configured to regulate a position of a first portion of the band, and a second regulation portion configured to regulate a position of a second portion of the band. A distance between the first regulation portion and the second regulation portion is smaller than a diameter of the wire rod.

Further features of the present invention will become apparent from the following description of exemplary embodiments with reference to the attached drawings.

DESCRIPTION OF THE EMBODIMENTS

Figure 1A:
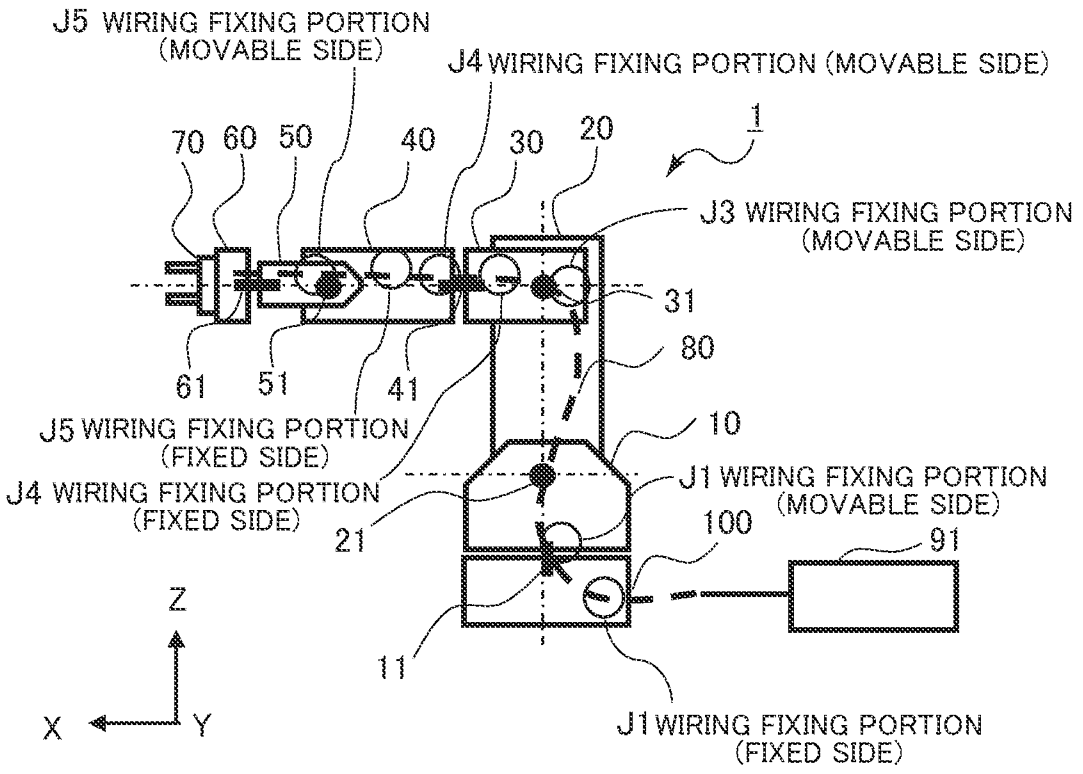
FIG. 1A is a schematic side view illustrating an overall configuration of an articulated robot device according to an embodiment.

A technique described in Japanese Patent Application Laid-Open No. 2014-111294 has a certain level of effect, but has an issue that a wire rod bundle moves depending on an operation status of a robot device. For this reason, the effect of reducing the absolute value of a reaction force generated in the wire rod bundle and keeping the reaction force constant is not sufficient, and for example, in a robot engaged in assembly work of minute loads, sufficient control accuracy may not be achieved.

The factors obtained by specific examination include a fact that the wire diameter of wire rods used in a multi-axis articulated robot may change depending on the specification of an end effector. Furthermore, a stranded wire may be used as a measure against electric noise, but the wire diameter of a stranded wire varies depending on the portion. Furthermore, there is always component variation in wire rod diameter. Therefore, the wire diameter is not uniquely determined.

In a case where there is variation in wire diameter, there are a wire rod bundle that is weakly bound and a wire rod bundle that is strongly bound. Since the bundle that is weakly bound easily moves during operation, a wire rod reaction force greatly varies when a robot device is operated. Furthermore, since there is a bundle having a different binding force, when the posture of the robot device is changed, balance fluctuation of the wire rod reaction force is likely to occur. Therefore, a generated internal force varies depending on the portion and time, and as a result, the detection accuracy of torque sensors decreases. Furthermore, in the bundle that is strongly bound, the stress in the vicinity of a binding point is excessively increased during operation, and thus an issue of shortening the life of the wire rods also occurs.

Therefore, there has been a demand for a technique that enables a reaction force generated when a device is operated to be reduced and the life of wire rods to be lengthened regardless of the diameter of the wire rods.

Embodiments of the present invention will be described with reference to the drawings. The embodiments described below are examples, and for example, detailed configurations can be appropriately changed and implemented by those skilled in the art without departing from the gist of the present invention.

Note that, in the drawings referred to in the following description of the embodiments and examples, elements denoted by the same reference signs have similar functions unless otherwise specified.

In the following description, a wire rod or a cable refers to, for example, a flexible transmission member (wiring) for transmitting a control signal and drive energy in order to drive and control an actuator of each joint and an end effector. The flexible transmission member (wiring) includes, for example, a line through which an electric signal or an optical signal is transmitted as a control signal, and a line or a pipeline through which drive energy such as electric power, hydraulic pressure, or air pressure is supplied. Specifically, in a robot using rotary drive sources such as motors for driving units (actuators) that drive joints or an end effector, wire rods such as electric wires are used as transmission members that transmit control signals or drive power to the motors or drive circuits thereof. Furthermore, in a robot device including various sensors such as torque sensors and image sensors in the vicinities of an arm and joints, signal lines (electric wires or optical fibers) are used as transmission members for communication between the sensors and a control portion. Furthermore, in a robot device using actuators using hydraulic pressure, air pressure, or the like to drive joints or an end effector, pressure tubes formed from a flexible material such as rubber are used as transmission members in order to transmit drive signals (energy). As described above, a wire rod is typically an electric wire, an optical fiber, or a pressure tube, but the type and thickness are not particularly specified. Furthermore, in a case where a plurality of wire rods is bundled and handled, they may be referred to as a bundle wire or a wire harness, but the number and type of bundled wire rods are not particularly specified.

First Embodiment

Basic Configuration of Robot Device

Figure 1B:
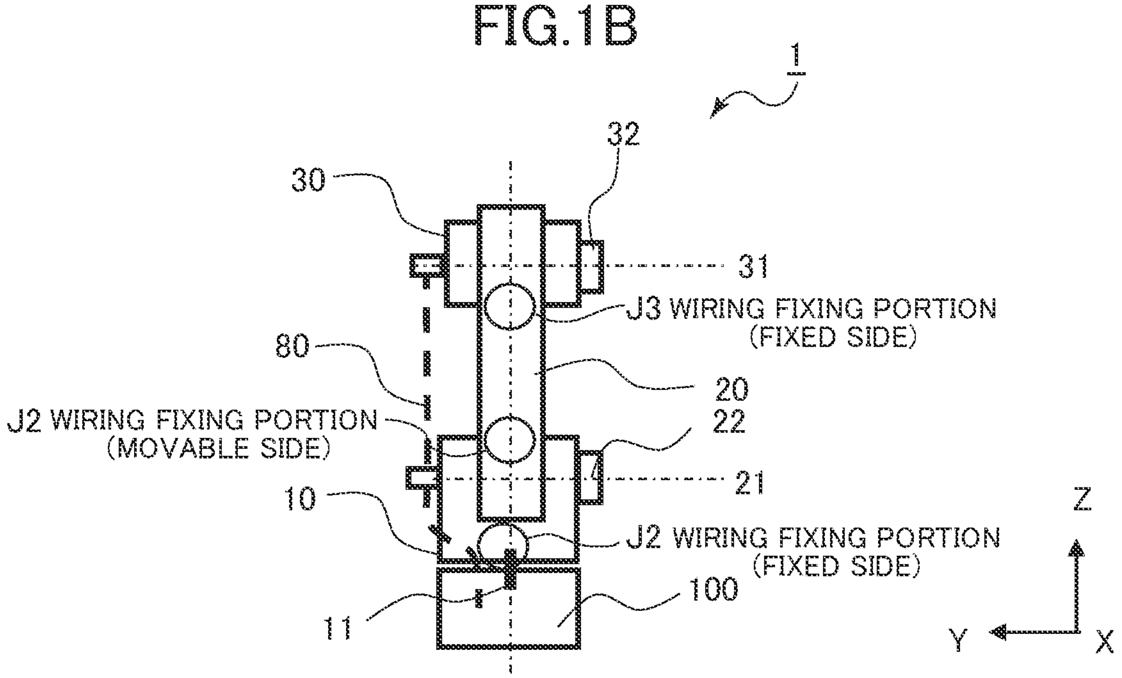
FIG. 1B is a schematic view of a robot arm 1 as viewed from the right in FIG. 1A along an X direction.

FIG. 1A is a schematic side view illustrating an overall configuration of an articulated robot device according to an embodiment, and FIG. 1B is a schematic view of a robot arm 1 of the robot device as viewed from the right in FIG. 1A along an X direction. Coordinate axes of a three-dimensional (XYZ) coordinate system used for controlling the robot device are illustrated in the lower left part of FIG. 1A and the lower right part of FIG. 1B. For example, a posture illustrated in FIG. 1A can be set to the initial posture of the robot arm 1.

As illustrated in FIG. 1A, the robot device includes the robot arm 1 (robot main body) and a control device 91 that controls the robot arm 1.

Figure 2:
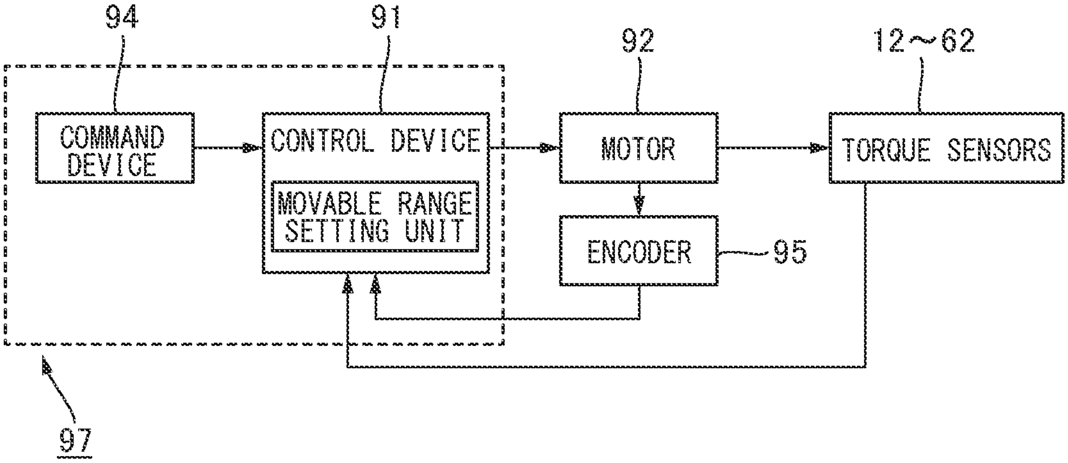
FIG. 2 is a schematic block diagram for describing a control system of the articulated robot device according to the embodiment.

FIG. 2 is a schematic block diagram for describing a control system of the articulated robot device according to the embodiment. As illustrated in FIG. 2, a command device 94 is connected to the control device 91, and the control device 91 and the command device 94 are included in a control system 97 of the robot arm 1 (robot main body). The command device 94 is a teaching device such as a teaching pendant.

In the command device 94, for example, an operation portion for changing the posture (position and angle) of joints of the robot arm 1, the position of a reference portion arranged at the distal end of the robot arm 1, or the like is arranged. When any robot operation is performed in the operation portion of the command device 94, the control device 91 controls operation of the robot arm 1 via a cable 80 (wire rods) in accordance with the operation of the command device 94. At that time, the control device 91 performs a robot control program including a control program to control each portion of the robot arm 1.

Note that the robot control program may be recorded in any computer-readable recording medium as long as the recoding medium is computer-readable. For example, a read-only memory (ROM), a disk, an external storage device, or the like may be used as a recording medium for supplying the program. As a specific example, a non-volatile memory such as a flexible disk, an optical disk, a magneto-optical disk, a magnetic tape, or a universal serial bus (USB) memory, a solid state drive (SSD), or the like can be used as a recording medium.

The robot arm 1 illustrated in FIGS. 1A and 1B is a robot arm having a configuration in which a plurality of links is connected to each other via a plurality of joints (six axes) in a serial link format, for example. An end effector 70 is connected to a link 60 at the distal end of the robot arm 1. Links 10, 20, 30, 40, 50, and 60 of the robot arm 1 are, for example, connected as follows via rotary joints 11, 21, 31, 41, 51, and 61.

A base 100 (base portion) of the robot arm 1 and the link 10 are connected by the rotary joint 11 that rotates around a rotation axis in a Z-axis direction. The rotary joint 11 is assumed to have a movable range of about ±180 degrees from the initial posture, for example. The link 10 and the link 20 of the robot arm 1 are connected by the rotary joint 21. A rotation axis of the rotary joint 21 corresponds to a Y-axis direction in the illustrated state. The rotary joint 21 is assumed to have a movable range of about ±80 degrees from the initial posture, for example.

The link 20 and the link 30 of the robot arm 1 are connected by the rotary joint 31. A rotation axis of the rotary joint 31 corresponds to the Y-axis direction in the illustrated state. The rotary joint 31 is assumed to have a movable range of about ±70 degrees from the initial posture, for example. The link 30 and the link 40 of the robot arm 1 are connected by the rotary joint 41. A rotation axis of the rotary joint 41 corresponds to an X-axis direction in the illustrated state. The rotary joint 41 is assumed to have a movable range of about ±180 degrees from the initial posture, for example.

The link 40 and the link 50 of the robot arm 1 are connected by the rotary joint 51. A rotation axis of the rotary joint 51 corresponds to the Y-axis direction in the illustrated state. The rotary joint 51 is assumed to have a movable range of about ±120 degrees from the initial posture, for example. The link 50 and the link 60 of the robot arm 1 are connected by the rotary joint 61. A rotation axis of the rotary joint 61 corresponds to the X-axis direction in the illustrated state. The rotary joint 61 is assumed to have a movable range of about ±240 degrees from the initial posture, for example.

As described above, in the present embodiment, rotation axes of the rotary joints 11, 41, and 61 are arranged in parallel (or coaxial) to central axes (one-dot chain lines) of two links to which each of the rotary joints is coupled, and are arranged so that the (relative) angles about rotation axes of the two links can be changed. On the other hand, rotation axes of the rotary joints 21, 31, and 51 are arranged so as to be able to change the intersecting (relative) angles of central axes of two links to which each of the rotary joints is coupled.

Furthermore, the end effector 70 such as an (electric) hand or an air hand (pneumatically driven) for performing assembly work or movement work in a production line is connected to the distal end of the link 60 of the robot arm 1. The end effector 70 is assumed to be attached to the link 60 by a (semi-) fixing portion (not illustrated) such as screwing, or attachable by a detachable portion (not illustrated) such as latch (ratchet) fastening. In particular, in a case where the end effector 70 is detachable, a method for controlling the robot arm 1 to detach or replace the end effector arranged at a supply position (not illustrated) by operation of the robot itself is also conceivable.

Positions of Torque Sensors

For example, in a case of the rotary joint 21 of the robot arm 1, as illustrated in FIG. 1B, a torque sensor 22 that measures drive torque of a motor (not illustrated) that drives the rotary joint 21, that is, a rotary drive force applied from the motor to the link 20 is included. The torque sensor 22 is arranged at a predetermined position on a drive axis of a drive system including, for example, the motor or additionally a reduction gear arranged inside the rotary joint 21. The torque sensor 22 used in the present embodiment for measuring a rotary drive force of the rotary joint is not limited to a particular formula or structure. Furthermore, torque sensors 12, 32, 42, 52, and 62 are assumed to be arranged in the other respective rotary joints 11, 31, 41, 51, and 61 similarly to the torque sensor 22.

Path of Wire Rods

The rotary joints 11 to 61 and the end effector 70 of the robot arm 1 illustrated in FIGS. 1A and 1B are driven by, for example, electric rotary drive sources, for example, motors. In this case, in the rotary joints, reduction gears using wave gear mechanisms or the like may be used in addition to the motors. Furthermore, in the end effector such as a hand or a gripper, a speed reduction or drive direction conversion mechanism such as a rack and pinion may be used. The motors that drive the rotary joints 11 to 61 and the end effector 70 are arranged at predetermined respective positions inside the rotary joints and the end effector 70. Note that, in the present embodiment, these motors are assumed to be arranged inside the joints, but the motors and/or the reduction gears may be arranged outside the joints.

In a case where drive portions of the rotary joints 11 to 61 are the motors, wire rods including a cable, wires, or the like are required as transmission portions for transmitting energy (drive power) or control signals for driving the respective motors, that is, drive signals. Such wire rods may be in the form of a wire harness obtained by binding a plurality of wire rods, or in the form of a multi-cable obtained by accommodating a plurality of wire rods in a covering of one package.

Furthermore, a case where the drive portions of the rotary joints 11 to 61 and the end effector 70 are formed by pressure mechanisms using hydraulic pressure or air pressure is also conceivable. In this case, drive energy or control signals (drive signals) need to be transmitted in the form of pressure to respective portions of the robot arm 1, that is, the rotary joints 11 to 61 and the end effector 70. In this case, wire rods such as flexible pressure tubes are preferably used as transmission portions for transmitting drive energy or control signals.

In the embodiment exemplified here, the drive portions of the rotary joints 11 to 61 and the end effector 70 are motors, and accordingly, wire rods serving as the transmission portions for transmitting drive energy or control signals to the respective portions are an (electric) cable 80. Furthermore, the cable 80 includes, for example, a plurality of wire rods that communicates between the rotary joints (or the end effector 70) and the control device 91, and has, for example, a wire harness (bundle wire) configuration. Furthermore, the cable 80 includes signal lines for communication between the torque sensors 12 to 62 and the control device 91. However, the embodiments of the present invention are not limited to this example.

A routing path (installation position) of the cable 80 is schematically indicated by a broken line in FIGS. 1A and 1B. The cable 80 is arranged inside or outside the base 100 and the links 10 to 60 so as not to hinder operation of the robot arm 1 or interfere with peripheral devices, and is held by the arm via wire rod holding members. The wire rod holding members are included on movable sides and fixed sides of the joints, and in the drawing, the installation positions are illustrated as a J1 wiring fixing portion (fixed side) to a J5 wiring fixing portion (fixed side) and a J1 wiring fixing portion (movable side) to a J5 wiring fixing portion (movable side).

Shape of Wire Rod Holding Members

Figure 3A:
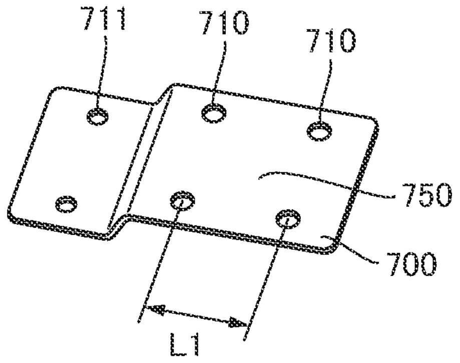
FIG. 3A is a view illustrating an appearance of a wire rod holding member 700 according to a first embodiment.

FIG. 3A illustrates an appearance of a wire rod holding member 700 according to a first embodiment. The wire rod holding member 700 includes openings 710 for passing bands (bundle wire bands) for holding wire rods, and two screw holes 711 for passing screws for fixing the wire rod holding member 700 to a robot device. Furthermore, the wire rod holding member 700 includes a contact portion 750 that comes in contact with the cable 80 (wire rods) for holding the cable 80. Two openings 710 are a pair, and in the example of FIG. 3A, two pairs of openings 710 are included. Pairs of holes are sets of two openings 710 arranged in a direction intersecting the longitudinal direction of wire rods for holding the wire rods by the wire rod holding member 700 using a strong binding force using the bands. The openings included in the pairs may be referred to as a first regulation portion that regulates the position of a first portion of the bands and a second regulation portion that regulates the position of a second portion of the bands. Note that the number and positions of the pairs of the openings 710 are not limited to the illustrated example. The wire rod holding member 700 can be formed, for example, by sheet-metal processing of a metal plate.

Figure 3B:
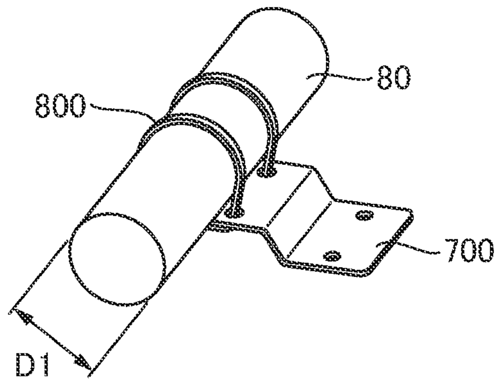
FIG. 3B is a perspective view illustrating a state in which a cable 80 is fixed to the wire rod holding member 700 according to the first embodiment by bands 800.
Figure 3C:
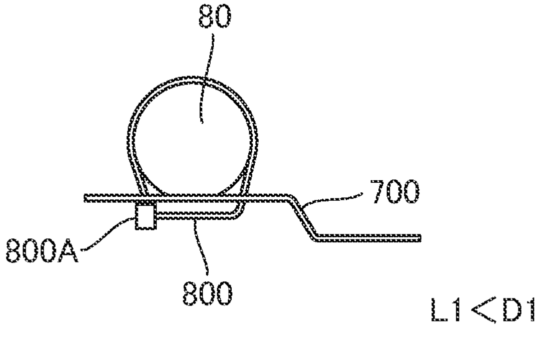
FIG. 3C is a side view illustrating the state in which the cable 80 is fixed to the wire rod holding member 700 according to the first embodiment by the bands 800.

FIG. 3B is a perspective view illustrating a state in which the cable 80 is fixed to the wire rod holding member 700 according to the first embodiment by the bands 800. FIG. 3C is a side view illustrating the state in which the cable 80 is fixed to the wire rod holding member 700 according to the first embodiment by the bands 800. Note that, in FIGS. 3B and 3C, for convenience of illustration, an aspect in which the wire rod holding member 700 is fixed to the robot device is not illustrated, but the wire rod holding member 700 is fixed to the robot device via screws penetrating the screw holes 711. Note that, in the present embodiment, in order to make the wire rod holding member 700 detachable from the robot device, the wire rod holding member 700 is fixed to the robot device using screws, but a fixing method is not limited to this example.

A band 800 wound around the side surface of the cable 80 is passed through the wire rod holding member 700 to the opposite side of the cable 80 via a pair of openings 710, and is fastened by a fastening portion 800A to form an annular body. In order to bind the cable 80 to the wire rod holding member 700 using sufficient fixing strength, for example, the bands 800 including ratchet type fastening portions 800A can be suitably used. Note that, in the present embodiment, the cable 80 is fixed using the two bands 800, but the number of the bands 800 is not limited to this example.

In the present embodiment, in a case where an interval (distance) between a pair of openings 710 included in the wire rod holding member 700 for passing an annular band 800 at two portions is L1, and the diameter of the cable 80 is D1, L1 is always smaller than D1 (L1<D1). By such a configuration being adopted, the bands 800 can be brought into contact with at least a half or more of the circumference of the cable 80 to bind the cable 80. Therefore, sufficient fixing strength is secured, movement (play) of the cable 80 is reduced when the robot device operates, and the cable 80 can be stably held.

According to the present embodiment, since movement (play) of the cable 80 is reduced even if the posture of the robot device is changed, balance fluctuation of a wire rod reaction force is less likely to occur. Therefore, variation of a generated internal force depending on the portion and time is reduced, and as a result, the detection accuracy of torque sensors is stabilized. Therefore, sufficient control accuracy can be achieved if the robot device of the present embodiment is engaged in, for example, assembly work of minute loads.

Furthermore, according to the present embodiment, in a case where the cable is held at a plurality of portions, a stable fixed state in which play is reduced is achieved at any fixed portion. Therefore, as compared with the conventional fixing method in which play is likely to occur, displacement (uncontrollability) of the cable when the posture of the robot device changes is reduced, and stress concentration on a specific portion of the cable can be reduced. Therefore, the usable period (life) of the wire rods can be lengthened.

Second Embodiment

A second embodiment in which a wire rod holding member having a form different from that of the wire rod holding member 700 of the first embodiment is adopted will be described. For convenience of description, description of matters common to the first embodiment (configuration of a robot device, and the like) is simplified or omitted.

Figure 4A:
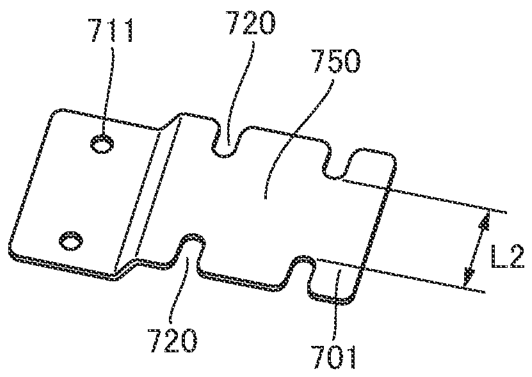
FIG. 4A is a view illustrating an appearance of a wire rod holding member 701 according to a second embodiment.

FIG. 4A illustrates an appearance of a wire rod holding member 701 according to the second embodiment. The wire rod holding member 701 includes slits 720 for passing bands (bundle wire bands) for holding wire rods, and two screw holes 711 for passing screws for fixing the wire rod holding member 701 to a robot device. Furthermore, the wire rod holding member 701 includes a contact portion 750 that comes in contact with a cable 80 (wire rods) for holding the cable 80. Two slits 720 are a slit pair, and in the example of FIG. 4A, two slit pairs are included. A slit pair is a set of two slits arranged to face each other in a direction orthogonal to the longitudinal direction of the wire rods for holding the wire rods by the wire rod holding member 701. The slits included in the pairs may be referred to as a first regulation portion that regulates the position of a first portion of the bands and a second regulation portion that regulates the position of a second portion of the bands. Note that the number and positions of the slit pairs are not limited to the illustrated example. When the wire rod holding member 701 is viewed in plan view, the slits 720 are included along the radial direction of the held wire rods. The wire rod holding member 701 can be formed, for example, by sheet-metal processing of a metal plate.

Figure 4B:
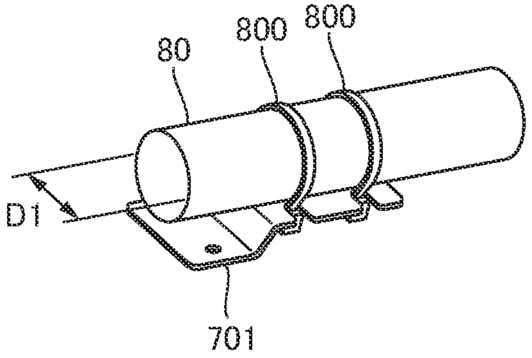
FIG. 4B is a perspective view illustrating a state in which a cable 80 is fixed to the wire rod holding member 701 according to the second embodiment by bands 800.
Figure 4C:
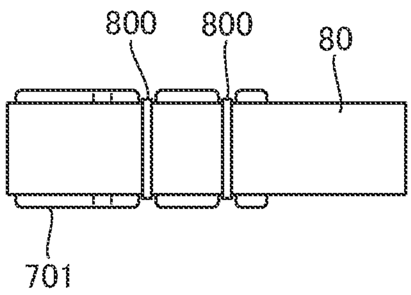
FIG. 4C is a top view illustrating the state in which the cable 80 is fixed to the wire rod holding member 701 according to the second embodiment by the bands 800.

FIG. 4B is a perspective view illustrating a state in which the cable 80 is fixed to the wire rod holding member 701 according to the second embodiment by the bands 800. FIG. 4C is a top view illustrating the state in which the cable 80 is fixed to the wire rod holding member 701 according to the second embodiment by the bands 800. Note that, in FIGS. 4B and 4C, for convenience of illustration, an aspect in which the wire rod holding member 701 is fixed to the robot device is not illustrated, but the wire rod holding member 701 is fixed to the robot device via screws penetrating the screw holes 711. Note that, in the present embodiment, in order to make the wire rod holding member 701 detachable from the robot device, the wire rod holding member 701 is fixed to the robot device using screws, but a fixing method is not limited to this example.

A band 800 wound around the side surface of the cable 80 is passed through the wire rod holding member 701 to the opposite side of the cable 80 via a pair of opposing slits 720, and is fastened on the opposite side of the cable 80 to form an annular body. In order to bind the cable 80 to the wire rod holding member 701 using sufficient fixing strength, for example, the bands 800 including ratchet type fastening portions can be suitably used. Note that, in the present embodiment, the cable 80 is fixed using the two bands 800, but the number of the bands 800 is not limited to this example.

In the present embodiment, the interval (distance) between a pair of slits 720 included in the wire rod holding member 701 so as to face each other for passing an annular band 800 at two portions is set to L2, and the diameter of the cable 80 is set to D1. The present embodiment is characterized in that L2 is always smaller than D (L2<D1). By such a configuration being adopted, the bands 800 can be brought into contact with at least a half or more of the circumference of the cable 80 to bind the cable 80. Therefore, sufficient fixing strength is secured, movement (play) of the cable 80 is reduced when the robot device operates, and the cable 80 can be stably held.

Furthermore, in the first embodiment, the end of a band 800 needs to be passed through openings 710 of the wire rod holding member 700 while the band 800 is wound around the cable 80 for holding the cable, and thus operation is not necessarily simple.

On the other hand, in the present embodiment, as can be understood from FIG. 4C, the cable 80 is placed on the wire rod holding member 701, and a band 800 only needs to be aligned with slits 720 and fastened on the back side of the wire rod holding member 701 to form an annular body. Therefore, fixing work can be easily performed, and manufacturing costs of a robot device can be reduced.

According to the present embodiment, since movement (play) of the cable 80 is reduced even if the posture of the robot device is changed, balance fluctuation of a wire rod reaction force is less likely to occur. Therefore, variation of a generated internal force depending on the portion and time is reduced, and as a result, the detection accuracy of torque sensors is stabilized. Therefore, sufficient control accuracy can be achieved if the robot device of the present embodiment is engaged in, for example, assembly work of minute loads.

Furthermore, according to the present embodiment, in a case where the cable is held at a plurality of portions, a stable fixed state in which play is reduced is achieved at any fixed portion. Therefore, as compared with the conventional fixing method in which play is likely to occur, displacement (uncontrollability) of the cable when the posture of the robot device changes is reduced, and stress concentration on a specific portion of the cable can be reduced. Therefore, the usable period (life) of the wire rods can be lengthened. Note that the present embodiment and the modifications may be combined with the other embodiments and the modifications described in the specification.

Third Embodiment

A third embodiment in which a wire rod holding member having a form different from that of the wire rod holding member 701 of the second embodiment is adopted will be described. For convenience of description, description of matters common to the first embodiment or the second embodiment (configuration of a robot device, and the like) is simplified or omitted.

Figure 5A:
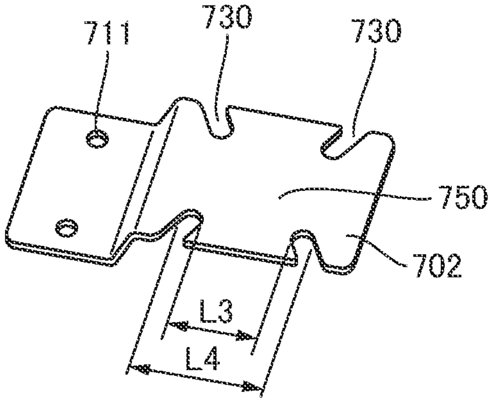
FIG. 5A is a view illustrating an appearance of a wire rod holding member 702 according to a third embodiment.

FIG. 5A illustrates an appearance of a wire rod holding member 702 according to the third embodiment. The wire rod holding member 702 includes slits 730 for passing bands (bundle wire bands) for holding wire rods, and two screw holes 711 for passing screws for fixing the wire rod holding member 702 to a robot device. Furthermore, the wire rod holding member 702 includes a contact portion 750 that comes in contact with a cable 80 (wire rods) for holding the cable 80. Two slits 730 are a slit pair, and in the example of FIG. 5A, two slit pairs are included. A slit pair is a set of two slits arranged to face each other in a direction intersecting the longitudinal direction of the wire rods for holding the wire rods by the wire rod holding member 702. In other words, when the wire rod holding member 702 is viewed in plan view, the slits are included along directions inclined with respect to the radial direction of the held wire rods. The slits included in the pairs may be referred to as a first regulation portion that regulates the position of a first portion of the bands and a second regulation portion that regulates the position of a second portion of the bands. Note that the number and positions of the slit pairs are not limited to the illustrated example. The wire rod holding member 702 can be formed, for example, by sheet-metal processing of a metal plate.

Figure 5B:
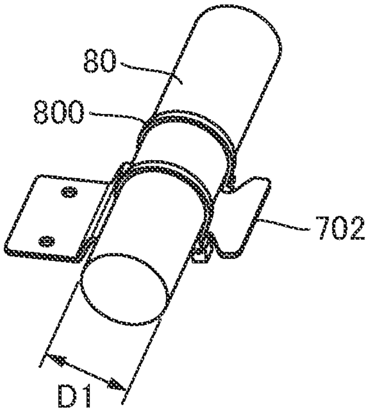
FIG. 5B is a perspective view illustrating a state in which a cable 80 is fixed to the wire rod holding member 702 according to the third embodiment by bands 800.
Figure 5C:
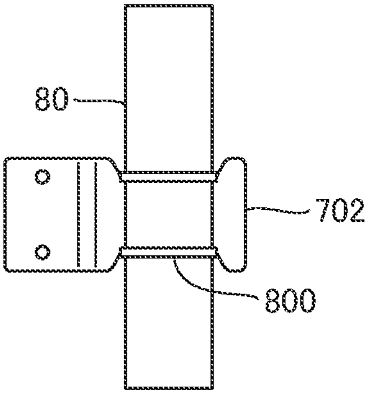
FIG. 5C is a top view illustrating the state in which the cable 80 is fixed to the wire rod holding member 702 according to the third embodiment by the bands 800.

FIG. 5B is a perspective view illustrating a state in which the cable 80 is fixed to the wire rod holding member 702 according to the third embodiment by the bands 800. FIG. 5C is a top view illustrating the state in which the cable 80 is fixed to the wire rod holding member 702 according to the third embodiment by the bands 800. Note that, in FIGS. 5B and 5C, for convenience of illustration, an aspect in which the wire rod holding member 702 is fixed to the robot device is not illustrated, but the wire rod holding member 702 is fixed to the robot device via screws penetrating the screw holes 711. Note that, in the present embodiment, in order to make the wire rod holding member 702 detachable from the robot device, the wire rod holding member 702 is fixed to the robot device using screws, but a fixing method is not limited to this example.

A band 800 wound around the side surface of the cable 80 is passed through the wire rod holding member 702 to the opposite side of the cable 80 via a pair of opposing slits 730, and is fastened on the opposite side of the cable 80 to form an annular body. In order to bind the cable 80 to the wire rod holding member 702 using sufficient fixing strength, for example, the bands 800 including ratchet type fastening portions can be suitably used. Note that, in the present embodiment, the cable 80 is fixed using the two bands 800, but the number of the bands 800 is not limited to this example.

In the present embodiment, in a pair of slits 720 included in the wire rod holding member 702 so as to face each other for passing an annular band 800 at two portions, the slits are separated at an interval (distance) of L4 at the edge portion of the wire rod holding member 702. However, the interval (distance) between the slits decreases as a distance from the edge portion increases, and the tip portions of the slits are separated by an interval (distance) of L3. That is, the maximum interval (maximum distance) between two slits included in a pair is L4, and the minimum interval (minimum distance) is L3 (L3<D4). Here, the diameter of the cable 80 is set to D1. The present embodiment is characterized in that L3 is always smaller than D1 (L3<D1). By such a configuration being adopted, the bands 800 can be brought into contact with at least a half or more of the circumference of the cable 80 to bind the cable 80. Therefore, sufficient fixing strength is secured, movement (play) of the cable 80 is reduced when the robot device operates, and the cable 80 can be stably held.

Furthermore, in the first embodiment, the end of a band 800 needs to be passed through openings 710 of the wire rod holding member 700 while the band 800 is wound around the cable 80 for holding the cable, and thus operation is not necessarily simple.

On the other hand, in the present embodiment, as can be understood from FIG. 5C, the cable 80 is placed on the wire rod holding member 702, and a band 800 only needs to be aligned with slits 730 and fastened on the back side of the wire rod holding member 702 to form an annular body. Moreover, in the present embodiment, as a band 800 is pulled, the band 800 naturally slides toward a direction in which the slit interval is narrowed. Therefore, fixing work can be easily performed, and manufacturing costs of a robot device can be reduced. Furthermore, by controlling a force at the time of pulling a band 800, the band 800 can be fastened in an annular shape without sliding the band 800 to the position of L3 that is the minimum interval (minimum distance). That is, the fixing strength of the cable 80 can be controlled.

According to the present embodiment, since movement (play) of the cable 80 is reduced even if the posture of the robot device is changed, balance fluctuation of a wire rod reaction force is less likely to occur. Therefore, variation of a generated internal force depending on the portion and time is reduced, and as a result, the detection accuracy of torque sensors is stabilized. Therefore, sufficient control accuracy can be achieved if the robot device of the present embodiment is engaged in, for example, assembly work of minute loads.

Furthermore, according to the present embodiment, in a case where the cable is held at a plurality of portions, a stable fixed state in which play is reduced is achieved at any fixed portion. Therefore, as compared with the conventional fixing method in which play is likely to occur, displacement (uncontrollability) of the cable when the posture of the robot device changes is reduced, and stress concentration on a specific portion of the cable can be reduced. Therefore, the usable period (life) of the wire rods can be lengthened. Note that the present embodiment and the modifications may be combined with the other embodiments and the modifications described in the specification.

Fourth Embodiment

A fourth embodiment in which a wire rod holding member having a form different from that of the wire rod holding member 700 of the first embodiment is adopted will be described. For convenience of description, description of matters common to the first embodiment (configuration of a robot device, and the like) is simplified or omitted.

Figure 6A:
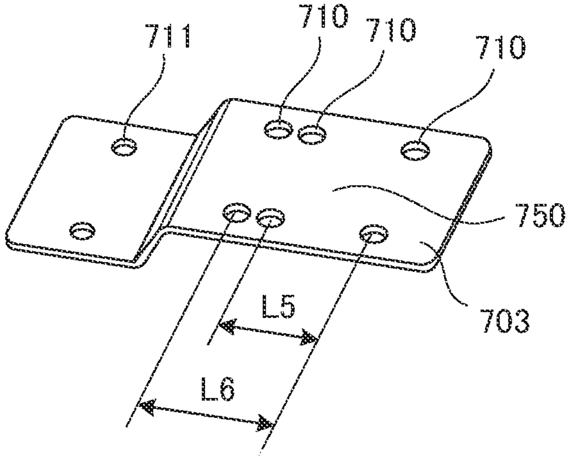
FIG. 6A is a view illustrating an appearance of a wire rod holding member 703 according to a fourth embodiment.

FIG. 6A illustrates an appearance of a wire rod holding member 703 according to the fourth embodiment. The wire rod holding member 703 includes openings 710 for passing bands (bundle wire bands) for holding wire rods, and two screw holes 711 for passing screws for fixing the wire rod holding member 703 to a robot device. Furthermore, the wire rod holding member 703 includes a contact portion 750 that comes in contact with a cable 80 (wire rods) for holding the cable 80. From a plurality of the openings 710, two openings are selected as a pair according to the thickness of held wire rods. Pairs of openings are sets of two openings 710 arranged in a direction intersecting the longitudinal direction of wire rods for holding the wire rods by the wire rod holding member 703. In this example, any one of three pairs of a set of openings 710 arranged at an interval (distance) of L5, a set of openings 710 arranged at an interval (distance) of L6, and a set of openings 710 arranged at an interval (distance) of L6-L5 can be selected according to the thickness of wire rods. The openings included in the pairs may be referred to as a first regulation portion that regulates the position of a first portion of the bands and a second regulation portion that regulates the position of a second portion of the bands. Note that, although at least three openings are included, the number and positions of the openings 710 are not limited to the illustrated example. The wire rod holding member 703 can be formed, for example, by sheet-metal processing of a metal plate.

Figure 6B:
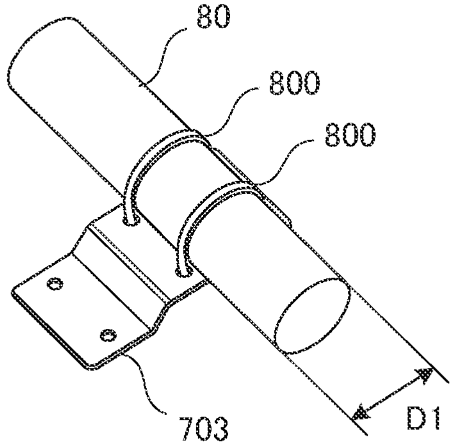
FIG. 6B is a perspective view illustrating a state in which a thick cable 80 having a diameter D1 is fixed to the wire rod holding member 703 according to the fourth embodiment by bands 800.
Figure 6C:
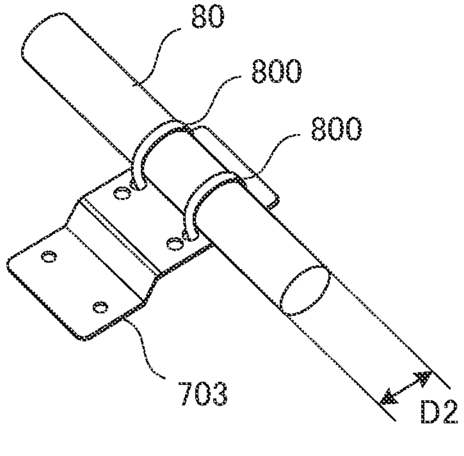
FIG. 6C is a perspective view illustrating a state in which a thin cable 80 having a diameter D2 is fixed to the wire rod holding member 703 according to the fourth embodiment by the bands 800.

FIG. 6B is a perspective view illustrating a state in which a thick cable 80 having a diameter D1 is fixed to the wire rod holding member 703 according to the fourth embodiment by the bands 800. FIG. 6C is a perspective view illustrating a state in which a thin cable 80 having a diameter D2 is fixed to the wire rod holding member 703 according to the fourth embodiment by the bands 800. Note that, in FIGS. 6B and 6C, for convenience of illustration, an aspect in which the wire rod holding member 703 is fixed to the robot device is not illustrated, but the wire rod holding member 703 is fixed to the robot device via screws penetrating the screw holes 711. Note that, in the present embodiment, in order to make the wire rod holding member 703 detachable from the robot device, the wire rod holding member 703 is fixed to the robot device using screws, but a fixing method is not limited to this example.

A band 800 wound around the side surface of the cable 80 is passed through the wire rod holding member 703 to the opposite side of the cable 80 via a pair of openings 710 selected according to the thickness of the cable 80, and is fastened on the opposite side of the cable 80 to form an annular body. In order to bind the cable 80 to the wire rod holding member 703 using sufficient fixing strength, for example, the bands 800 including ratchet type fastening portions can be suitably used. Note that, in the present embodiment, the cable 80 is fixed using the two bands 800, but the number of the bands 800 is not limited to this example.

In the present embodiment, as can be understood from FIGS. 6B and 6C, a pair of openings having an appropriate interval (distance) can be selected according to the thickness of a cable, and a cable having various thicknesses can be stably held using the same wire rod holding member 703. At that time, it goes without saying that a pair of openings is selected such that an interval (distance) between the openings is smaller than the thickness (diameter) of the cable.

According to the present embodiment, since movement (play) of the cable 80 is reduced even if the posture of the robot device is changed, balance fluctuation of a wire rod reaction force is less likely to occur. Therefore, variation of a generated internal force depending on the portion and time is reduced, and as a result, the detection accuracy of torque sensors is stabilized. Therefore, sufficient control accuracy can be achieved if the robot device of the present embodiment is engaged in, for example, assembly work of minute loads.

Furthermore, according to the present embodiment, in a case where the cable is held at a plurality of portions, a stable fixed state in which play is reduced is achieved at any fixed portion. Therefore, as compared with the conventional fixing method in which play is likely to occur, displacement (uncontrollability) of the cable when the posture of the robot device changes is reduced, and stress concentration on a specific portion of the cable can be reduced. Therefore, the usable period (life) of the wire rods can be lengthened.

Furthermore, according to the present embodiment, a cable having various thicknesses can be stably held using wire rod holding members of the same type, and thus, manufacturing costs of a robot device can be reduced. Note that the present embodiment and the modifications may be combined with the above various embodiments and the modifications described above.

Fifth Embodiment

A fifth embodiment in which a wire rod holding member having a form different from that of the wire rod holding member 700 of the first embodiment is adopted will be described. For convenience of description, description of matters common to the first embodiment (configuration of a robot device, and the like) is simplified or omitted. In the present embodiment, a wire rod holding member 900 has a configuration integrated with a main body component of a robot device (for example, frame).

Figure 7A:
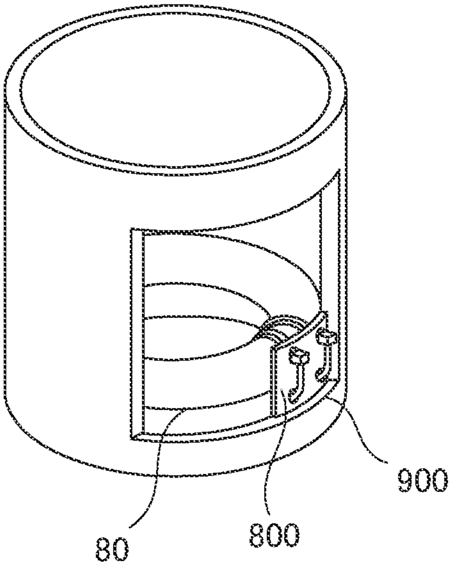
FIG. 7A is a perspective view of a state in which a cable 80 is fixed to a wire rod holding member 900 according to a fifth embodiment by bands 800.
Figure 7B:
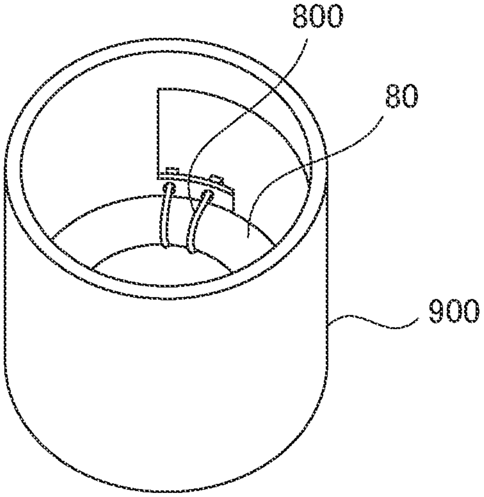
FIG. 7B is a perspective view of the state in which the cable 80 is fixed to the wire rod holding member 900 according to the fifth embodiment by the bands 800 as viewed from a direction different from FIG. 7A.

FIGS. 7A and 7B are perspective views of the state in which a cable 80 is fixed to the wire rod holding member 900 according to the fifth embodiment by bands 800 as viewed from different directions. The wire rod holding member 900 is a member in which a wire rod holding member similar to that of the first embodiment is integrated with a frame housing that is a structural component of a robot arm. The surface position of a wire rod holding portion holding wire rods is continuous with the inner surface of the frame housing.

Also in the present embodiment, in a case where an interval (distance) between a pair of openings included in the wire rod holding member 900 for passing an annular band 800 at two portions is L1, and the diameter of the cable 80 is D1, L1 is always smaller than D1 (L1<D1). By such a configuration being adopted, the bands 800 can be brought into contact with at least a half or more of the circumference of the cable 80 to bind the cable 80. Therefore, sufficient fixing strength is secured, movement (play) of the cable 80 is reduced when the robot device operates, and the cable 80 can be stably held.

According to the present embodiment, since movement (play) of the cable 80 is reduced even if the posture of the robot device is changed, balance fluctuation of a wire rod reaction force is less likely to occur. Therefore, variation of a generated internal force depending on the portion and time is reduced, and as a result, the detection accuracy of torque sensors is stabilized. Therefore, sufficient control accuracy can be achieved if the robot device of the present embodiment is engaged in, for example, assembly work of minute loads.

Furthermore, according to the present embodiment, in a case where the cable is held at a plurality of portions, a stable fixed state in which play is reduced is achieved at any fixed portion. Therefore, as compared with the conventional fixing method in which play is likely to occur, displacement (uncontrollability) of the cable when the posture of the robot device changes is reduced, and stress concentration on a specific portion of the cable can be reduced. Therefore, the usable period (life) of the wire rods can be lengthened.

Furthermore, in the present embodiment, when a structural component of the robot device main body (for example, frame) is manufactured by casting or the like, the wire rod holding member can be manufactured together, and thus separately manufacturing and fixing the wire rod holding member to the main body are unnecessary. By the number of components being reduced, manufacturing costs and assembly costs can be reduced. Note that the present embodiment and the modifications may be combined with the other embodiments and the modifications described in the specification.

Sixth Embodiment

A sixth embodiment in which a wire rod holding member having a form different from that of the wire rod holding member 900 of the fifth embodiment is adopted will be described. In the present embodiment, a wire rod holding member 905 has a configuration integrated with a main body component of a robot device (for example, frame).

Figure 8:
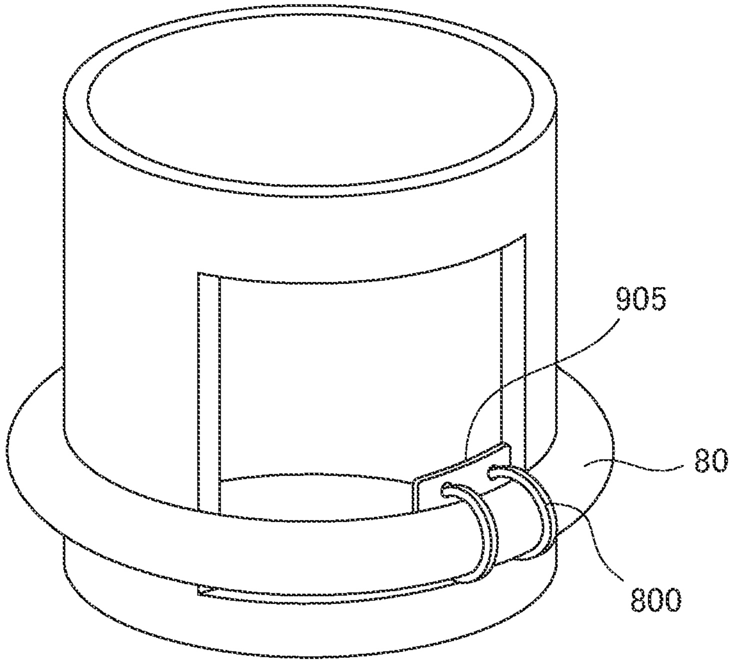
FIG. 8 is a perspective view of a state in which a cable 80 is fixed to a wire rod holding member 905 according to a sixth embodiment by bands 800.
Figure 9D:
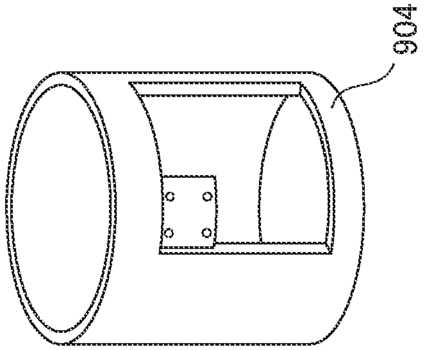
FIG. 9D is a view illustrating an appearance of a wire rod holding member 904 according to the seventh embodiment.
Figure 9C:
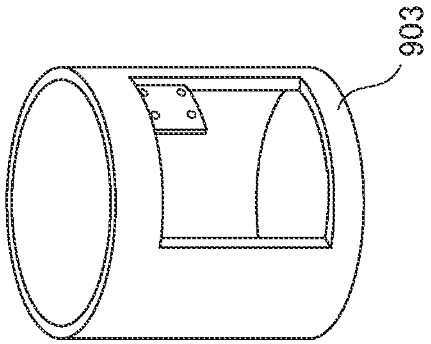
FIG. 9C is a view illustrating an appearance of a wire rod holding member 903 according to the seventh embodiment.
Figure 9B:
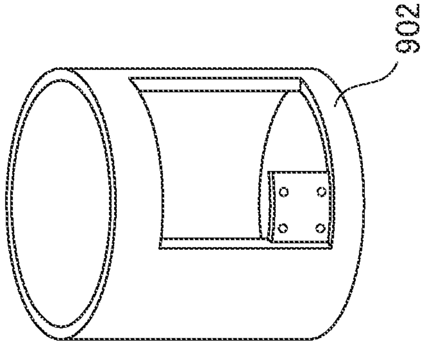
FIG. 9B is a view illustrating an appearance of a wire rod holding member 902 according to the seventh embodiment.
Figure 9A:
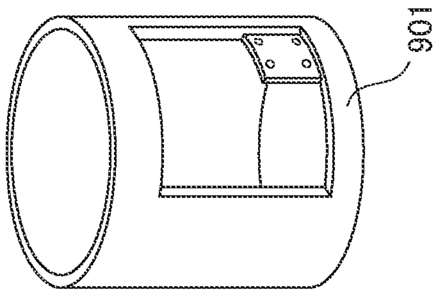
FIG. 9A is a view illustrating an appearance of a wire rod holding member 901 according to a seventh embodiment.

FIG. 8 is a perspective view of a state in which a cable 80 is fixed to the wire rod holding member 905 according to the sixth embodiment by bands 800. The wire rod holding member 905 is a member in which a wire rod holding member similar to that of the first embodiment is integrated with a frame housing of a robot arm. The surface position of a wire rod holding portion holding wire rods is continuous with the outer surface of the frame housing.

Also in the present embodiment, in a case where an interval (distance) between a pair of openings included in the wire rod holding member 900 for passing an annular band 800 at two portions is L1, and the diameter of the cable 80 is D1, L1 is always smaller than D1 (L1<D1). By such a configuration being adopted, the bands 800 can be brought into contact with at least a half or more of the circumference of the cable 80 to bind the cable 80. Therefore, sufficient fixing strength is secured, movement (play) of the cable 80 is reduced when the robot device operates, and the cable 80 can be stably held.

According to the present embodiment, since movement (play) of the cable 80 is reduced even if the posture of the robot device is changed, balance fluctuation of a wire rod reaction force is less likely to occur. Therefore, variation of a generated internal force depending on the portion and time is reduced, and as a result, the detection accuracy of torque sensors is stabilized. Therefore, sufficient control accuracy can be achieved if the robot device of the present embodiment is engaged in, for example, assembly work of minute loads.

Furthermore, according to the present embodiment, in a case where the cable is held at a plurality of portions, a stable fixed state in which play is reduced is achieved at any fixed portion. Therefore, as compared with the conventional fixing method in which play is likely to occur, displacement (uncontrollability) of the cable when the posture of the robot device changes is reduced, and stress concentration on a specific portion of the cable can be reduced. Therefore, the usable period (life) of the wire rods can be lengthened.

Furthermore, in the present embodiment, when a component of the robot device main body (for example, frame) is manufactured by casting or the like, the wire rod holding member can be manufactured together, and thus separately manufacturing and fixing the wire rod holding member to the main body are unnecessary. By the number of components being reduced, manufacturing costs and assembly costs can be reduced. Note that the present embodiment and the modifications may be combined with the other embodiments and the modifications described in the specification.

Seventh Embodiment

FIGS. 9A to 9D illustrate a wire rod holding member formed to be able to change the relative position of a wire rod holding portion with respect to a frame. The wire rod holding member is manufactured by a core when the frame is cast.

Also in the present embodiment, in a case where an interval (distance) between a pair of holes included in the wire rod holding member for passing an annular band at two portions is L1, and the diameter of a cable is D1, L1 is always smaller than D1 (L1<D1). By such a configuration being adopted, bands can be brought into contact with at least a half or more of the circumference of the cable to bind the cable. Therefore, sufficient fixing strength is secured, movement (play) of the cable is reduced when a robot device operates, and the cable can be stably held.

According to the present embodiment, since movement (play) of the cable is reduced even if the posture of the robot device is changed, balance fluctuation of a wire rod reaction force is less likely to occur. Therefore, variation of a generated internal force depending on the portion and time is reduced, and as a result, the detection accuracy of torque sensors is stabilized. Therefore, sufficient control accuracy can be achieved if the robot device of the present embodiment is engaged in, for example, assembly work of minute loads.

Furthermore, according to the present embodiment, in a case where the cable is held at a plurality of portions, a stable fixed state in which play is reduced is achieved at any fixed portion. Therefore, as compared with the conventional fixing method in which play is likely to occur, displacement (uncontrollability) of the cable when the posture of the robot device changes is reduced, and stress concentration on a specific portion of the cable can be reduced. Therefore, the usable period (life) of the wire rods can be lengthened.

Furthermore, in the present embodiment, in the robot device, for example, when a path of the wire rods is changed, the position of the wire rod holding portion can be changed as indicated by 901 to 904, and thus mounting work is facilitated. Note that the present embodiment and the modifications may be combined with the other embodiments and the modifications described in the specification.

Eighth Embodiment

Figure 10:
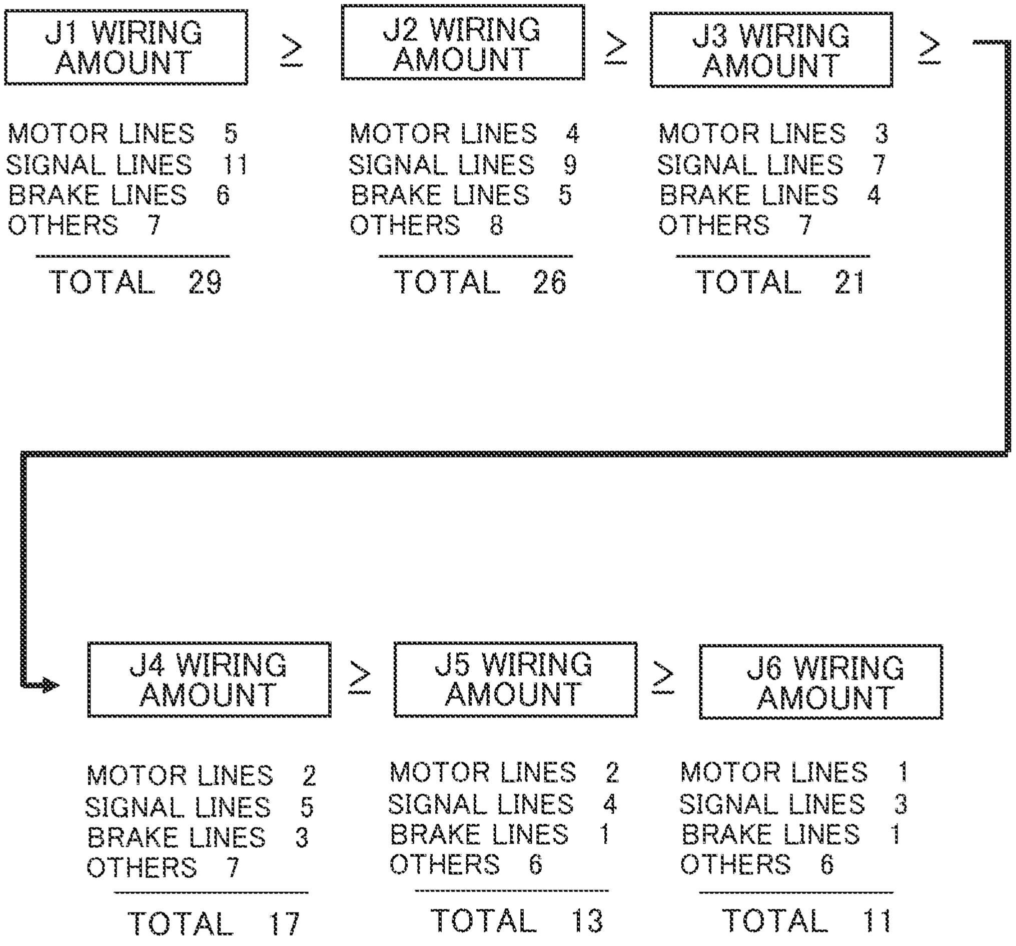
FIG. 10 is a diagram for specifically describing a situation in which the thickness of a cable varies in a wire rod holding method according to an eighth embodiment.

As an eighth embodiment, a fixing method in a case where the thickness of a cable 80 varies depending on the portion in the articulated robot device illustrated in FIG. 1 will be described. FIG. 10 is a diagram for specifically describing that the thickness of the cable 80 varies depending on the portion.

The cable 80 extends from the rotary joint 11 toward the end effector 70 in FIG. 1, and for example, in the vicinity of the rotary joint 11, wire rods for driving and controlling all the joints and the end effector are bundled. Therefore, the number (amount) of lines included in the wire harness (bundle wire) is large, and the diameter of the cable 80 is large (J1 wiring amount in FIG. 10). However, since the wire rods for driving and controlling the respective joints branch in a path extending toward the end effector 70, the number (amount) of lines included in the wire harness (bundle wire) decreases toward the end effector 70. Conversely, when viewed from the end effector 70 toward the rotary joint 11, the wire rods for driving and controlling the respective joints merge, and thus the number (amount) of lines included in the wire harness (bundle wire) increases toward the rotary joint 11.

As described in the first embodiment, wire rod holding portions are included on respective portions of the J1 wiring fixing portion (fixed side) to the J5 wiring fixing portion (fixed side) and the J1 wiring fixing portion (movable side) to the J5 wiring fixing portion (movable side). In the present embodiment, wire rod holding members corresponding to the thickness of the cable 80 at the respective installation portions are used, and a distance between the first regulation portion and the second regulation portion is always smaller than the diameter of the wire rods at any installation portion.

For example, in a case where wire rod holding members of the first embodiment are used, it is preferable to install the wire rod holding members 700 having smaller L1 from a J1 side toward a J5 side. Similarly, in a case where wire rod holding members of the second embodiment are used, it is preferable to install the wire rod holding members 701 having smaller L2 from the J1 side toward the J5 side. Furthermore, in a case where wire rod holding members of the third embodiment are used, it is preferable to install the wire rod holding members 702 having smaller L3 from the J1 side toward the J5 side. However, in a case where a band 800 can be fastened in an annular shape without sliding the band 800 necessarily to the position of L3 that is the minimum interval (minimum distance) by controlling a force at the time of pulling the band 800, the wire rod holding members 702 having the same form may be used at all the portions. Furthermore, in a case where wire rod holding members of the fourth embodiment are used, sets of holes suitable for the thicknesses of the cable 80 at the installation positions are preferably selected and used from a plurality of openings 710 of the wire rod holding members 703. Note that wire rod holding members of the same embodiment are not necessarily used at all the installation positions. For example, wire rod holding members of different embodiments may be combined such that the J1 wiring fixing portion (fixed side) is a wire rod holding member of the first embodiment, and the J2 wiring fixing portion (fixed side) is a wire rod holding member of the second embodiment.

According to the present embodiment, since movement (play) of the cable 80 is reduced even if the posture of the robot device in which the thickness of the cable varies depending on the portion is changed, balance fluctuation of a wire rod reaction force is less likely to occur. Therefore, variation of a generated internal force depending on the portion and time is reduced, and as a result, the detection accuracy of torque sensors is stabilized. Therefore, sufficient control accuracy can be achieved if the robot device of the present embodiment is engaged in, for example, assembly work of minute loads.

Furthermore, according to the present embodiment, in a case where the cable having different thicknesses depending on the portion is held at a plurality of portions, a stable fixed state in which play is reduced is achieved at any fixed portion. Therefore, as compared with the conventional fixing method in which play is likely to occur, displacement (uncontrollability) of the cable when the posture of the robot device changes is reduced, and stress concentration on a specific portion of the cable can be reduced. Therefore, the usable period (life) of the wire rods can be lengthened. Note that the present embodiment and the modifications may be combined with the above various embodiments and the modifications described above.

Other Embodiments

Note that the present invention is not limited to the above-described embodiments and examples, and many modifications can be made within the technical idea of the present invention.

Wire rod holding portions (holding mechanism) of the present invention can be applied to various machines and facilities such as industrial robots, service robots, and processing machines operated by numerical control by computers. For example, the present invention can be applied to a machine and equipment capable of automatically performing operation of expansion and contraction, bending and stretching, vertical movement, horizontal movement, or turning, or combined operation thereof on the basis of control performed by a control device via wire rods.

In particular, the present invention can be suitably used for a robot device including torque sensors and capable of torque control. For example, the present invention can be applied to a robot device that performs assembly work in which a large load of several hundred grams to several kilograms is applied to a target object such as assembling of an engine component of an automobile. Furthermore, for example, the present invention can be suitably used for a robot device that performs assembly work of minute loads in which a load applied to a target object at the time of assembly is about several grams such as an operation of a minute component having a weight of several grams, a thin film, or a sheet. That is, in a case where a robot device including the wire rod holding portions (holding mechanism) of the present invention is used, a method for manufacturing an article with high work accuracy (article manufacturing method) can be performed.

Furthermore, in the robot device in which wire rods are fixed using the wire rod holding portions (holding mechanism) of the present invention, the control portion drives and controls the actuators and the end effector via the wire rods, so that a robot control method for controlling operation of the robot device with high accuracy can be provided. The reason is described below. Since movement (play) of the wire rods is reduced when the posture of the robot device is changed by such a control method, balance fluctuation of a wire rod reaction force is less likely to occur. Variation of a generated internal force depending on the portion and time is reduced accordingly, and as a result, the detection accuracy of torque sensors is stabilized.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-200748, filed Dec. 10, 2021, which is hereby incorporated by reference herein in its entirety.

What is claimed is:

1. A holding mechanism configured to hold a wire rod by fastening with a band, comprising:

a holding member including a contact portion configured to come into contact with the wire rod, a first regulation portion configured to regulate a position of a first portion of the band, and a second regulation portion configured to regulate a position of a second portion of the band, wherein a distance between the first regulation portion and the second regulation portion is smaller than a diameter of the wire rod, and wherein slits are provided along directions inclined with respect to a radial direction of the wire rod parallel to a surface of the holding member in a case when the holding member is viewed in a plan view.

2. The holding mechanism according to claim 1, wherein the first regulation portion and the second regulation portion are openings included in the holding member.

3. The holding mechanism according to claim 2, wherein the holding member comprises at least three openings, and either the first regulation portion or the second regulation portion is selected from the at least three openings according to a diameter of the wire rod.

4. The holding mechanism according to claim 1, wherein the band is configured to be fastened on an opposite side of the wire rod with respect to the holding member.

5. The holding mechanism according to claim 1, wherein the band includes a ratchet type fastening portion.

6. The holding mechanism according to claim 1, wherein the wire rod is a flexible transmission member for transmitting a control signal and/or drive energy to an actuator of a robot device.

7. The holding mechanism according to claim 1, wherein the band is configured to be annularly wound around the wire rod.

8. A robot device comprising the holding mechanism according to claim 1, wherein the holding member is configured to be detachably fixed to a robot arm.

9. A robot device comprising the holding mechanism according to claim 1, wherein the holding member is configured to be integrated with a structural component of a robot arm.

10. The robot device according to claim 8, wherein the robot arm includes a plurality of joints, a plurality of links, and a plurality of holding members including the holding member, wherein the wire rod is held at a plurality of portions of the robot arm using the plurality of holding members, and wherein the wire rod has different thicknesses at at least two of the plurality of portions.

11. The robot device according to claim 8, wherein the robot arm includes a torque sensor, and the wire rod comprises a signal line for the torque sensor to communicate with a control portion.

12. A method for controlling the robot device according to claim 8, wherein a control portion is configured to transmit a control signal for controlling operation of the robot arm to a driving portion of the robot arm via the wire rod.

13. The method for controlling the robot device according to claim 12, wherein the robot arm includes a torque sensor, and the wire rod includes a signal line for the torque sensor to communicate with the control portion.

14. A method for manufacturing an article comprising:

operating the robot device according to claim 8; and assembling a component by the robot arm.

15. A computer-readable recording medium configured to record a program for causing a computer to perform the method for controlling the robot device according to claim 12.

* * * * *